Feb. 22, 1949.  E. C. HORTON ET AL  2,462,192
MOTOR SHAFT
Filed July 13, 1944
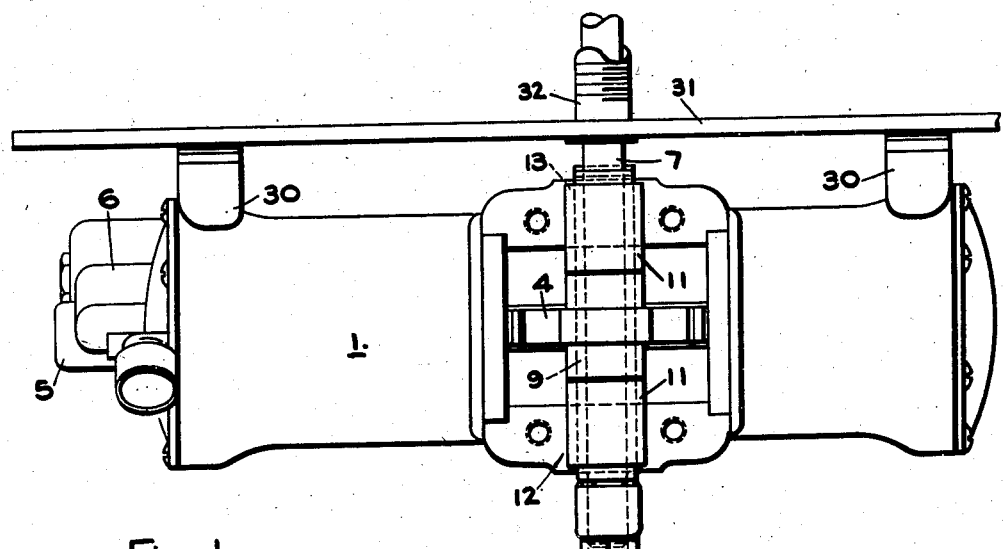
Fig. 1.
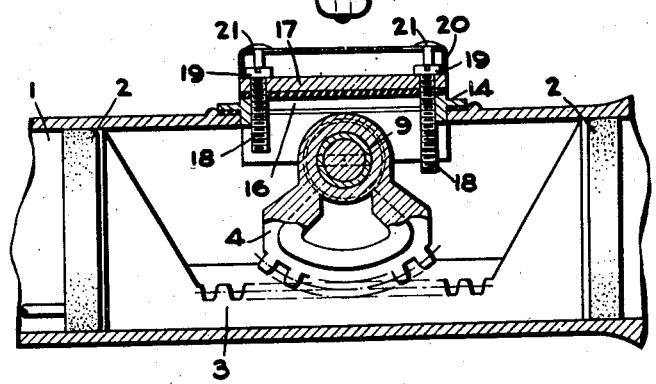
Fig. 2.
Fig. 3.
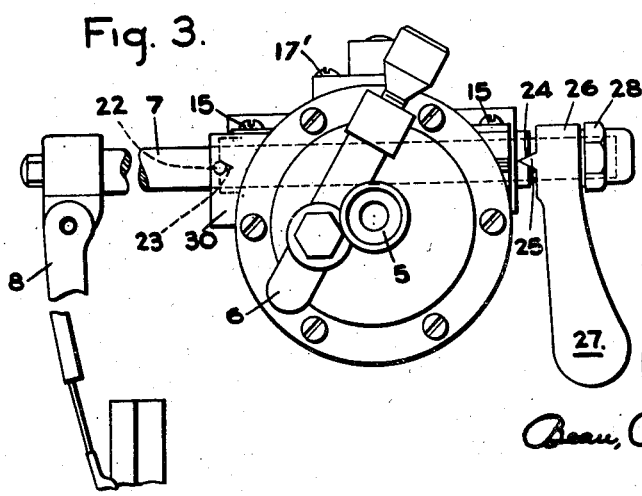
Fig. 4.
INVENTOR
ERWIN C. HORTON AND
BY EARL V. SCHAAL
ATTORNEYS Patented Feb. 22, 1949

2,462,192

UNITED STATES PATENT OFFICE 2,462,192

MOTOR SHAFT

Erwin C. Horton, Hamburg, and Earl V. Schaal, East Aurora, N. Y., assignors to Trico Products Corporation, Buffalo, N. Y.

Application July 13, 1944, Serial No. 544,766

5 Claims. (Cl. 64—1)

This invention relates to the fluid motor art and especially to that type employed in the windshield cleaner field, wherein motors of various designs and operational characteristics are required to meet the factory specifications and demands of the several motor car builders.

The primary object of the present invention is to provide a motor construction which may more readily be adapted to the various needs of the user. More particularly it has for its object to provide a fluid motor which is more universal in its application.

Again, the invention has for its object to provide a fluid motor of this character which is efficient in operation and practical in use.

In the drawing:

Fig. 1 is a top plan view of a motor embodying the present invention, with the closure removed;

Fig. 2 is a fragmentary view, in longitudinal section, of the motor;

Fig. 3 is an end elevation of the motor; and

Fig. 4 is a detailed view better depicting the segmental gear die cast about the tubular shaft.

Referring more particularly to the drawing, the numeral 1 designates the motor chamber in which reciprocates a piston 2 having a rack member 3 meshing with a segmental gear 4. The operating pressure is supplied through a pressure line connection 5 and operatively applied by automatic valve mechanism 6 first to one side of the piston and then to the opposite side thereof for effecting reciprocation of the latter. The foregoing is well known in the automotive trade for oscillating a wiper actuating shaft 7 and its wiper carrying arm 8 of a windshield cleaner. Heretofore the segmental gear has been secured directly to the shaft to unite the latter definitely as a permanent part of the motor. The lengths of the motor shaft 7 have been numerous according to the various types of installation and consequently a large number of motors has been kept in stock for promptly supplying the demands as made.

In accordance with the present invention the shaft is made replaceable so that one of the correct length may be substituted. To this end the segmental gear is die cast about a tubular or sleeve-like shaft 9, the latter being provided with a knurl 10 for keying the gear thereto. This hollow shaft 9, arranged transversely of the motor chamber, is supported at opposite sides of the segmental gear by a pair of self-lubricating bushings 11, such as porous bronze, which fit within seats 12 in the motor body 1 where they are prevented from endwise displacement by upstanding shoulders 13. A retaining closure 14 has like seats conformably fitting over the bushings 11 for holding the latter in place, the cap being secured in position by anchoring screws 15. The closure itself has an opening 16 through which access may be gained to the interior of the motor chamber, this opening being closed by the cover plate 17.

During high speed operation of the motor there is a tendency for the moving parts of the motor to override their normal limits of operation. To restrict such overriding action, there is provided a pair of limit pins or screws 18 arranged at opposite sides of the segmental gear for contact thereby. These limit pins may be threadedly adjustable through the cover plate 17 for regulating the extent of override, the plate being attached by suitable fasteners 17'. In order to preserve the factory setting of these limit pins, a protective cap 20 encloses the pin heads 19, the latter having undercut recesses into which the cap retaining rivets or fasteners 21 may be struck to insure the permanency of attachment and against tampering.

For detachably mounting the actuating shaft 7 the latter is provided at an intermediate point with a transverse key pin 22 designed to engage in a recess or seat 23 in the outer end of the hollow shaft. The inner end of the shaft is provided with a notch 24, herein shown as being V-shaped, to receive a tooth 25 formed on the hub 26 of a handle 27, the hub having an opening through which the actuating shaft extends. The protruding end of the actuating shaft is threaded to receive a nut 28 which secures the two interlocks at the opposite ends of the hollow shaft and thereby unites the two shafts into a unit firmly joined to the segmental gear for rocking therewith in unison.

The motor may be mounted in position on the windshield by means of spaced mounting lugs 30 or, where a single point of mounting attachment is desired, by means of a bracket 31 having a mounting sleeve 32 through which the actuating shaft extends. The bracket 31 is in such proximity to the adjacent end of the tubular shaft as to prevent accidental dislodgment of the key pin 22 should the nut 28 loosen.

This simplified motor fabrication is durable as well as economical to manufacture because the sleeve or tubular shaft is of one length and may therefore be easily placed in the mold for the die-casting of the gear 4 thereon. The complemental seats in the motor body and its closure serve to locate the tubular shaft definitely with respect to the motor and therefore the actuating shaft when secured to the sleeve is likewise definitely positioned for efficient operation. Being die-cast on the motor shaft unit the gear is firmly anchored against becoming loose when arrested positively by the limit pins.

While the foregoing description has been given in detail for the sake of clearness, it is not intended thereby to restrict the invention beyond the scope of the appended claims since the inventive principles of the invention may be incorporated in other physical embodiments without departing from the spirit of the invention.

What is claimed is:

1. A motor having a casing, an oscillatory shaft of tubular form journaled at its opposite ends in the casing, a second shaft received within the tubular shaft, a shoulder on the second shaft interlocking in a recess in one end of the tubular shaft and detachable therefrom by and upon relative axial movement between the shafts in one direction, means spaced from the shoulder and interlockingly connecting the second shaft to the tubular shaft by and upon opposite relative movement therebetween, and means common to both interlocks for concurrently making them effective.

2. A motor having a casing, an oscillatory shaft of tubular form journaled at its opposite ends in the casing, a second shaft received within the tubular shaft, a shoulder on the second shaft interlocking in a recess in one end of the tubular shaft and detachable therefrom by and upon relative axial movement between the shafts in one direction, a handle removably engaged with the second shaft and having a shoulder interlocking in a recess in the opposite end of the tubular shaft but detachable therefrom upon opposite relative movement between the shafts, and means operating to hold the shoulders engaged in their respective recesses thereby to connect the two shafts for movement in unison.

3. A motor having a casing, an oscillatory shaft of tubular form journaled at its opposite ends in the casing, a second shaft received within the tubular shaft, a shoulder on the second shaft interlocking in a recess in one end of the tubular shaft and detachable therefrom by and upon relative axial movement between the shafts in one direction, a handle removably engaged with the second shaft and having a shoulder interlocking in a recess in the opposite end of the tubular shaft but detachable therefrom upon opposite relative movement between the shafts, the second shaft protruding from the handle, and a clamp nut threaded on the protruding end of the second shaft and acting on the latter while reacting on the handle to secure the two interlocks.

4. A motor having a casing, an oscillatory shaft of tubular form journaled at its opposite ends in the casing, a second shaft received within the tubular shaft, a shoulder on the second shaft interlocking in a recess in one end of the tubular shaft and detachable therefrom by and upon relative axial movement between the shafts in one direction, the opposite end of the tubular shaft having a recess, a member on the second shaft interlocking in the latter recess, and a single means detachably securing both interlocks.

5. A motor having a casing, an oscillatory shaft of tubular form journaled at its opposite ends in the casing, a second shaft received within the tubular shaft, a shoulder on the second shaft interlocking in a recess in one end of the tubular shaft and detachable therefrom by and upon relative axial movement between the shafts in one direction, the opposite end of the tubular shaft having a recess, a member on the second shaft interlocking in the latter recess, a single means detachably securing both interlocks, and supplemental means acting to secure one of said interlocks upon failure of said detachable securing means whereby to insure operation of the second shaft.

ERWIN C. HORTON.
EARL V. SCHAAL.

REFERENCES CITED

The following references are of record in the file of this patent:

UNITED STATES PATENTS

| Number | Name | Date |
| --- | --- | --- |
| 82,447 | Snell | Sept. 22, 1868 |
| 259,893 | Miles | June 20, 1882 |
| 731,872 | Echols | June 23, 1903 |
| 1,009,066 | Heger | Nov. 21, 1911 |
| 1,223,924 | Alexanderson | Apr. 24, 1917 |
| 1,564,514 | Blackmore | Dec. 8, 1925 |
| 1,577,500 | Stewart | Mar. 23, 1926 |
| 1,649,119 | Kjelsberg | Nov. 15, 1927 |
| 1,834,607 | Dove | Dec. 1, 1931 |
| 1,957,697 | Conway | May 8, 1934 |
| 2,263,151 | White | Nov. 18, 1941 |
| 2,265,306 | Orshansky | Dec. 9, 1941 |
| 2,272,033 | Buchmann | Feb. 3, 1942 |

FOREIGN PATENTS

| Number | Country | Date |
| --- | --- | --- |
| 301,630 | Great Britain | Dec. 6, 1928 |